United States Patent [19]

Zurek et al.

[11] Patent Number: 4,912,602
[45] Date of Patent: Mar. 27, 1990

[54] MECHANICAL FASTENING SYSTEM FOR AN ELECTRONIC EQUIPMENT HOUSING

[75] Inventors: Michael W. Zurek, St. Charles; Ross P. Goodwin, Chicago; Scott D. Beutler, Hoffman Estates, all of Ill.

[73] Assignee: Motorola, Inc., Schaumburg, Ill.

[21] Appl. No.: 267,415

[22] Filed: Nov. 4, 1988

[51] Int. Cl.⁴ ............................................. H05K 5/00
[52] U.S. Cl. ...................................... 361/399; 455/90; 455/128
[58] Field of Search .............................. 361/386–389, 361/393–395, 399, 424; 429/96, 97, 98, 100; 455/346–349, 351, 128, 90

[56] References Cited

U.S. PATENT DOCUMENTS 4,791,527 12/1988 Brown .................................. 361/395
4,816,961 3/1989 Saulgeot .............................. 361/395

Primary Examiner—Roy N. Envall, Jr.
Attorney, Agent, or Firm—Raymond A. Jenski; Rolland R. Hackbart

[57] ABSTRACT

A housing for miniature electronic equipment is disclosed. A mechanical fastening system is utilized in holding front and rear portions of the housing together without conventional fasteners. The front housing portion has cantiliever beam spring catches which penetrate slots in the rear housing and captivate the rear housing and internal components. The spring catches are fixed in position by supporting rails of a detachable battery.

10 Claims, 4 Drawing Sheets

MECHANICAL FASTENING SYSTEM FOR AN ELECTRONIC EQUIPMENT HOUSING

BACKGROUND OF THE INVENTION

This invention relates generally to housings for electronic equipment and more particularly to a housing assembly for miniature radiotelephone equipment which utilizes mechanical interlocking to eliminate conventional fastening devices in holding housing elements together. This invention is related to U.S. patent application No. 269,853 filed on behalf of Ross P. Goodwin et al. on the same date herewith.

Miniature electronic equipment is often portable in nature and, as such, requires novel means to hold the elements of a protective housing for the electronic equipment together. Conventional techniques include the use of separate fasteners, fold over or heat staked tabs, or snap-together parts which secure parts of the housing to each other. Each of these techniques experience some difficulty when applied to miniature equipment. If the housing is constructed of plastic, the strength of the material may be insufficient to withstand the stress of fasteners or have enough material thickness to survive mechanical shock. Furthermore, it is desirable to be able to separate the housing parts should the electronic equipment ever need servicing.

There exists a need, therefore, to generate a mechanical interlocking system which provides an effective means by which the housing of compact and lightweight portable electronic equipment can be secured. The implementation of such a system should realize reduced cost and complexity of assembly when compared to more traditional mechanical fastening systems.

SUMMARY OF THE INVENTION

It is, therefore, one object of the present invention to provide a housing for miniature electronic equipment utilizing an integral attachment mechanism by which portions of the housing may be secured together.

It is another object of the present invention to utilize cantilevered spring catches integral to one portion of the housing to secure the one portion of the housing to a mating portion of the housing.

It is a further object of the present invention to interlock the spring catches so that the housing remains together unless the user desires to have the housing disassembled.

DESCRIPTION OF THE PREFERRED EMBODIMENT

Figure 1:
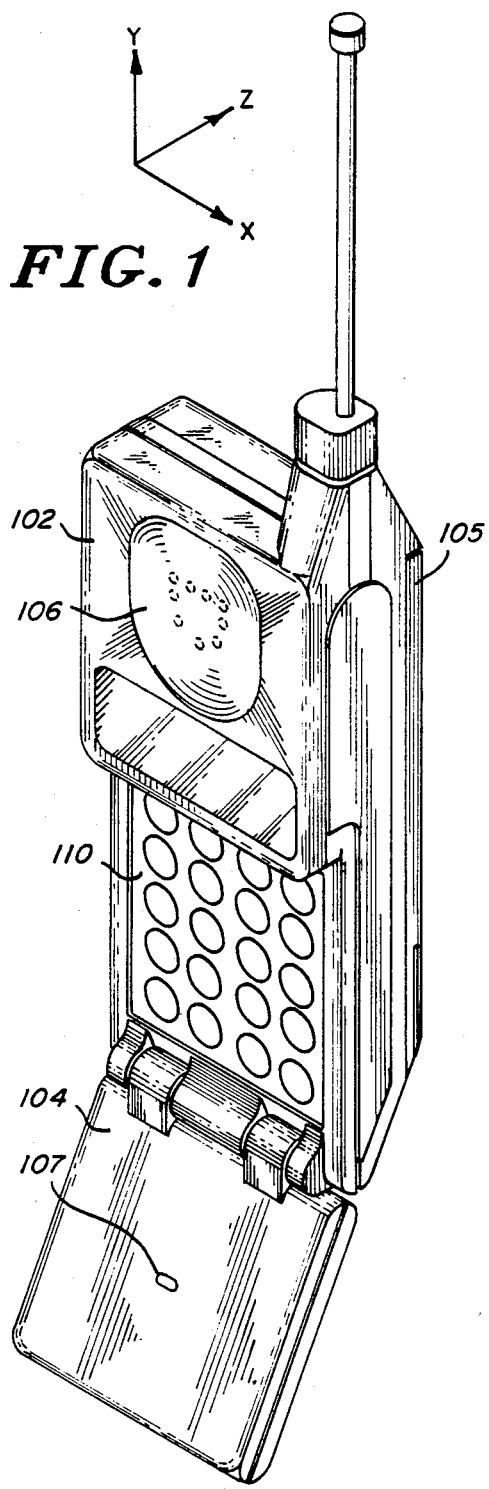
FIG. 1 is an isometric drawing of a hand-held portable radiotelephone which may employ the present invention.

A portable radiotelephone adapted to be used in a cellular radiotelephone system is shown in FIG. 1. The present invention may be employed in such a portable radiotelephone as well as in other miniature electronic equipment. The illustrated portable unit consists of two external portions, a body portion 102 and a flip element portion 104, in addition to a detachable battery 105. The drawing of FIG. 1 shows the flip element 104 in an "open" position such that a user of the portable unit may listen via earpiece 106 and may speak into a microphone 107. A telephone dial, or keypad, 110 consists of a plurality of buttons numbered one through zero, #, and *, in a familiar telephone arrangement. The keypad 110 also has additional function buttons such as "send", "end", "on/off", and other buttons associated with telephone number recall.

Since the portable radiotelephone of FIG. 1 is indeed portable, some source of electrical energy is necessary to power the electrical functions of this radiotelephone. The source of this electrical energy is a battery 105 which is typically implemented as a rechargeable electrochemical cell or cells which the user may recharge either while the battery is attached to the portable radiotelephone or when the battery is detached from the portable radiotelephone.

Figure 2A:
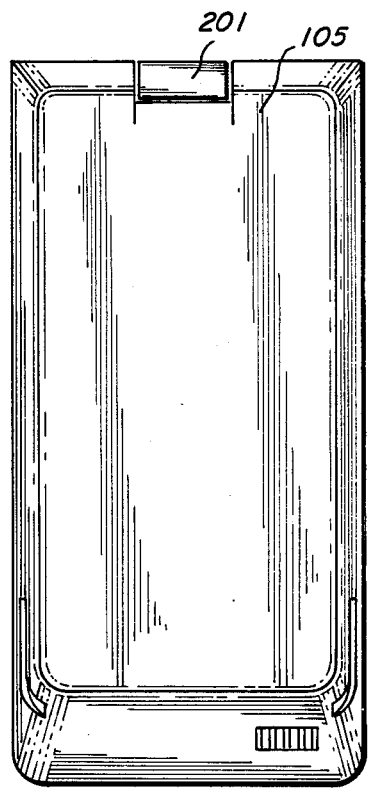
FIG. 2A is a drawing of the rear view of the removeable battery for the hand-held radiotelephone of FIG. 1.
Figure 2B:
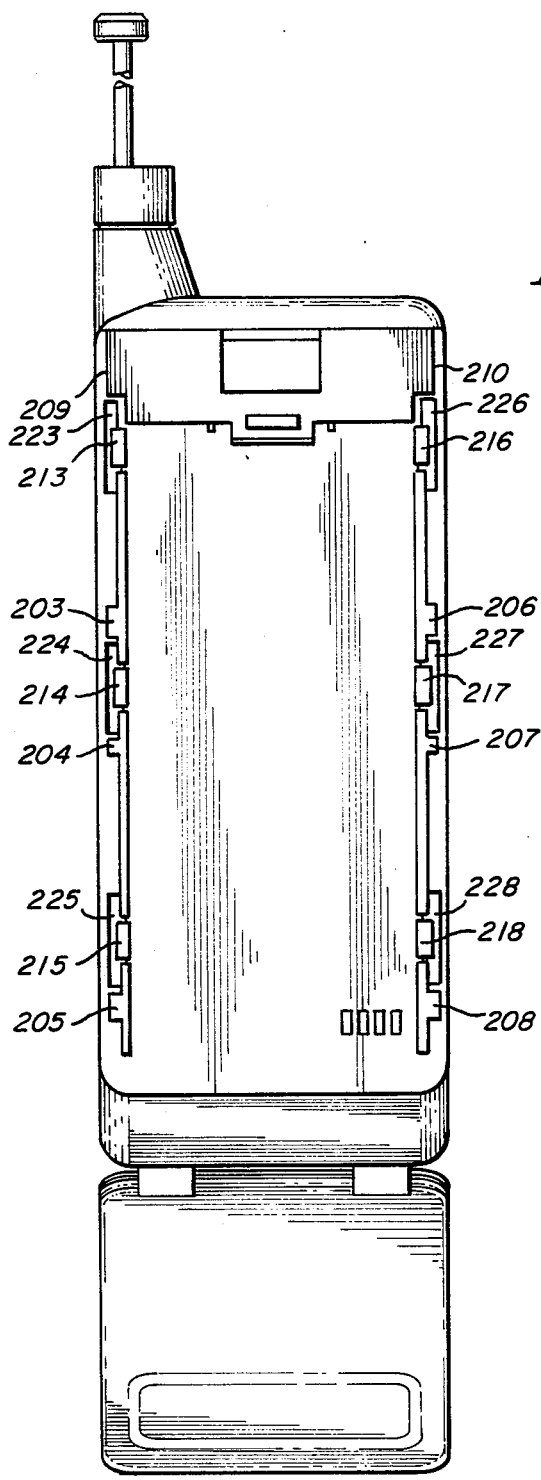
FIG. 2B is a drawing of the rear view of the hand-held radiotelephone of FIG. 1 with the removable battery detached.
Figure 5:
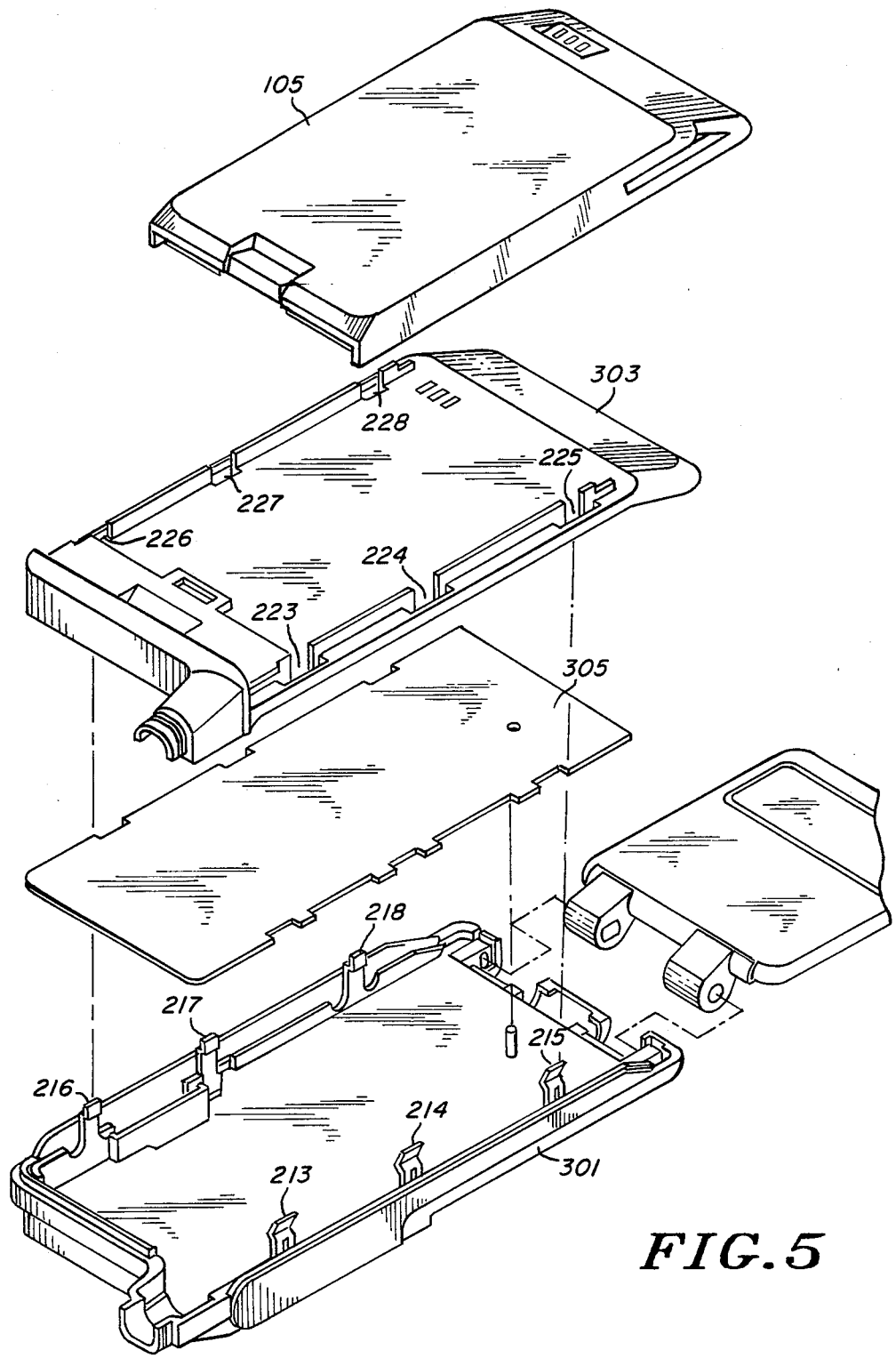
FIG. 5 is an exploded view of the hand-held radiotelephone of FIG. 1.

Referring now to FIG. 2, the battery 105 is shown detached from the portable radiotelephone of FIG. 1. Detachment may be accomplished by pressing button 201 which releases the battery 105 from a fastening mechanism. The battery 105 may then be slid along guide rails (203 through 210 in FIG. 2B) until opposing guide rails (not shown) on the battery 105 are cleared. The battery 105 can then be lifted free of the portable radiotelephone. The interlocking system of the preferred embodiment of the present invention consists of five major component parts, as shown in FIG. 5: a front main housing 301, a rear main housing, 303, a printed circuit board assembly, 305, six cantilever beam spring catches (shown as 213 through 218), and the battery 105.

Figure 3:
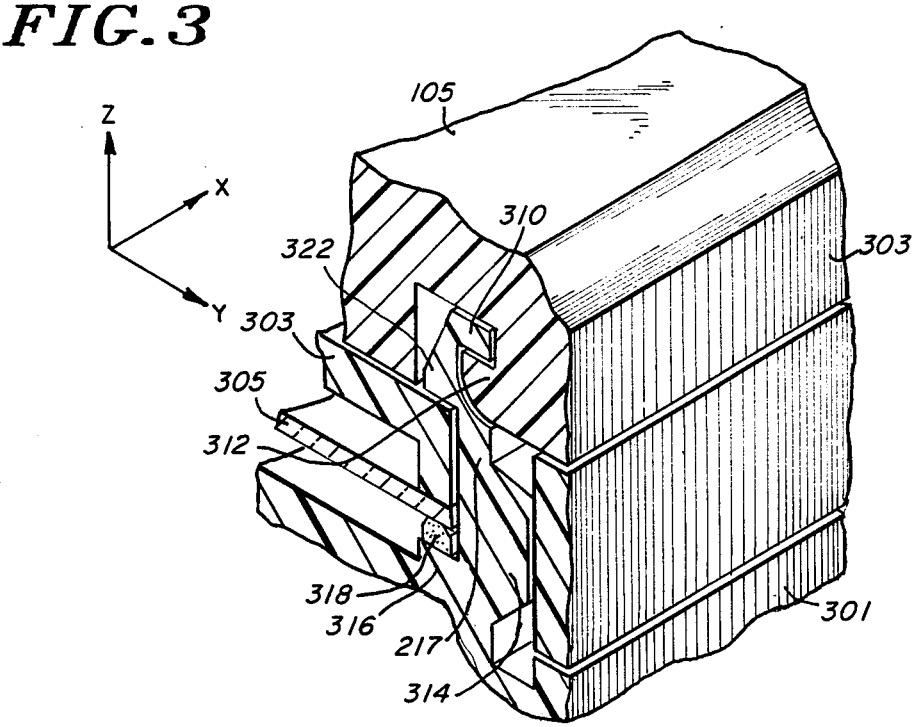
FIG. 3 is a cross-sectional view of a side of the hand-held radiotelephone of FIG. 1 showing the integral spring catches and interlocking battery elements of the present invention.
Figure 4:
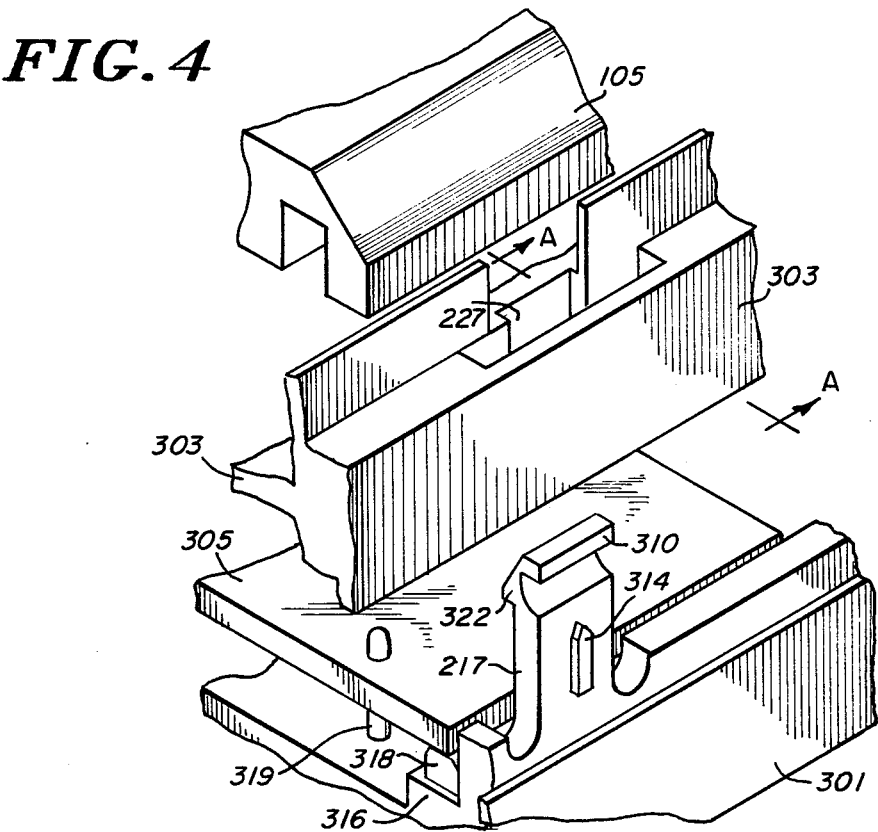
FIG. 4 is an exploded view of the side of the hand-held radiotelephone of FIG. 1 and showing the section line A-A resulting in FIG. 3.

A side view cross-section of these parts is illustrated in FIG. 3. As shown in FIG. 3 and an exploded view of these parts with section line A-A resulting in FIG. 3, is shown in FIG. 4, the first of these parts, the front main housing 301, is a thin wall plastic component having a "U" shaped cross-section and which functions as the front structural member of the portable radiotelephone and supports the keypad 110 and the earpiece 106. In the preferred embodiment, the six cantilever beam spring catches (elements 213 through 218 in FIG. 2B) are molded as part of the front main housing 301 within the walls of the "U" cross-section. The spring catches are disposed on the inside surface of the front main housing 301, opposite the appearance front surface visible in FIG. 1 and parallel to the side walls of the front housing. The spring catches provide a mounting surface for the printed circuit board assembly 305, captivate the rear main housing 303, and interlock with the battery 105.

A portion of each catch (for example catch 217) has a protrusion 310 which matches and interlocks with a similar guide rail protrusion 312 in the housing of the battery 105. Each catch also has a small rib 314 running vertically at the outer surface of each spring catch from near the battery interlocking mechanism to a point near the printed circuit board 305. Further, each catch has a shelf 316 upon which a 60 durometer polyurethane elastomer 318 is overmolded to both side surfaces. In areas adjacent to the catches on both sides, sections of this elastomer are raised to provide pressure pad surfaces.

The rear main housing 303 is also a thin wall plastic component which functions as the rear structural member of the unit. The rear main housing also has a "U" shaped cross section but has smaller dimensions so that it will fit within the outer walls of the front main housing 301. Additionally, this part has the majority of the battery retaining rails shown in FIG. 2B (as 203 through 210). There are six "T" shaped slots (223 through 228 in FIGS. 2B and 5) in the rear main housing 303 side walls which coincide with the catch locations on the front main housing. These slots provide a lead-in for the chassis catches and aid in engagement. The external walls at these positions are designed so that they will flex enough to allow catch insertion. The printed circuit board assembly 305 rests between the two main housings 301 and 303 and mechanically acts as a spacing element. This composite of housing, printed circuit board, and elastomer needs to be firmly compressed between and accurately registered to, the two main housing components. The Z axis tolerance build-up in this assembly is considerable and is largely responsible for the need to have the large deflection pressure pads 318 on both adjacent sides of each catch location.

The printed circuit board assembly is installed in the rear main housing 303 using two pilot pins (one of which is shown as pin 319 FIG. 4) for registration of the board assembly. The front main housing 301 with the spring catches (213 through 218) is assembled such that the outer walls of the front main housing 301 surround the sides of the rear main housing 303 and each spring catch is inserted into its respective "T" shaped slot in the rear main housing 303. Thus the rear main housing 303 uses the "T" shaped slots to position the assembly in the X and Y axes. As the two housing portions are assembled, engagement of the individual catches will cause a controlled deflection of the outer wall segments of the rear housing. This deflection is localized by the ribs 314 located on the outward facing surface of each of the spring catches 213 through 218. As the two parts approach full engagement, the elastomeric pressure pads 318 begin to deflect causing an increase in insertion force. When the two housing portions become fully engaged the catches 213 through 218 will snap back inwards to their preload position. At this point the installation force compressing the composite housing, printed circuit board, and elastomer may be removed. The pressure pads 318 working against the printed circuit board assembly 305 then cause the unit to separate slightly until underside protrusions 322 of each cantilever beam spring catch (e.g. 217) latch against the outer wall of the rear main housing 303.

The portable radiotelephone, in this state, is locked together in all 3 axes. It is a feature of the present invention that once the housings have been latched together with protrusions (like 322) of the spring catch securing the rear main housing 303, the positioning of the battery 105 in its locked position further captivates each spring catch in its housing-securing position. As shown in FIG. 3, the battery has interlocking guide rails 312 which slide beneath protrusions 310 of spring catch 217 and similar features of the other spring catches. When the battery is in its locked position, it can be seen that the spring catches cannot be flexed outward and the housing and circuit board assembly cannot be inadvertently disassembled. Furthermore, the proximity of the small catch ribs 314 to the front main rear housing 301 external walls aids in preventing the catches from disengaging during shock and vibration even when the battery 105 is not attached.

In summary, then, a housing for miniature electronic equipment has been shown and described. This housing utilizes a fastening system of cantilever beam spring catches which are part of the front housing and which captivate the rear housing and internal circuit board. The spring catches are secured by an interlocking battery which locks the spring catches into place when the battery is in its attached position.

We claim:

1. A housing for a portable radiotelephone comprising in combination:
    a first housing portion;
    a second housing portion having an inner and an outer surface;
    a detachable battery having a guide rail to mount said detachable battery to the portable radiotelephone; and
    a spring catch, said spring catch further comprising:
      (a) an elongate cantilevered beam having first and second ends, and an inner surface, and an outer surface and attached at said first end to said first housing portion,
      (b) first protrusion, disposed on said inner surface between said first end and said second end, to contact said outer surface of said second housing portion and to secure said second portion to said first housing portion, and
      (c) a second protrusion disposed on said outer surface of said spring catch between said first protrusion and said second end to engage said guide rail of said detachable battery.

2. A housing for a portable radiotelephone in accordance with claim 1 further comprising a printed circuit board disposed between said first housing portion and said second housing portion.

3. A housing for a portable radiotelephone in accordance with claim 2 wherein said spring catch further comprises a shelf portion disposed on said inner surface between said first and second ends to support said printed circuit board between said first housing portion and said second housing portion.

4. A housing for a portable radiotelephone comprising in combination:
    a first housing portion;
    a second housing portion having at least one surface;
    a third housing portion having a guide rail to mount said third housing portion to said first housing portion; and
    a spring catch, said spring catch further comprising:
      (a) an elongate cantilevered beam having first and second ends and attached at said first end to said first housing portion,
      (b) a first protrusion, disposed between said first end and said second end, to contact said surface of said second housing portion and to secure said second housing portion to said first housing portion, and
      (c) a second protrusion disposed between said first end and said second end to engage said guide rail of said third housing portion.

5. A housing for a portable radiotelephone in accordance with claim 4 further comprising a printed circuit board disposed between said first housing portion and said second housing portion.

6. A housing for a portable radiotelephone in accordance with claim 5 wherein said spring catch further comprises a shelf portion disposed between said first and second ends to support said printed circuit board between said first housing portion and said second housing portion.

7. A housing for a portable radiotelephone in accordance with claim 4 wherein said third housing portion further comprises a battery for the portable radiotelephone.

8. A housing for a portable radiotelephone in accordance with claim 4 wherein said second protrusion is further disposed between said first protrusion and said second end.

9. A mechanical fastener for a hand-held radiotelephone which utilizes a three part housing in which a first one of the three housing parts has a guide rail to mount it to at least one of the other housing parts, the mechanical fastener comprising:

an elongate cantilevered beam having first and second ends and attached at said first end to a second housing part;

a first protrusion, disposed between said first end and said second end of said elongate cantilevered beam, to contact a surface of a third housing part and to secure said third housing part to said second housing part; and a second protrusion disposed between said first end and said second end of said elongate cantilevered beam to engage said guide rail of said first housing part.

10. A mechanical fastener in accordance with claim 9 wherein said second protrusion is further disposed between said first protrusion and said second end.

* * * * *